Dec. 30, 1941. G. GHERTMAN 2,268,447
TABULATING MACHINE
Filed March 24, 1938 5 Sheets-Sheet 1

INVENTOR
Goino Ghertman
BY
ATTORNEY

Dec. 30, 1941.    G. GHERTMAN    2,268,447
TABULATING MACHINE
Filed March 24, 1938    5 Sheets-Sheet 2

INVENTOR
Goino Ghertman
BY
W. M. Wilson
ATTORNEY

Dec. 30, 1941.                G. GHERTMAN                2,268,447
                           TABULATING MACHINE
                         Filed March 24, 1938            5 Sheets-Sheet 3
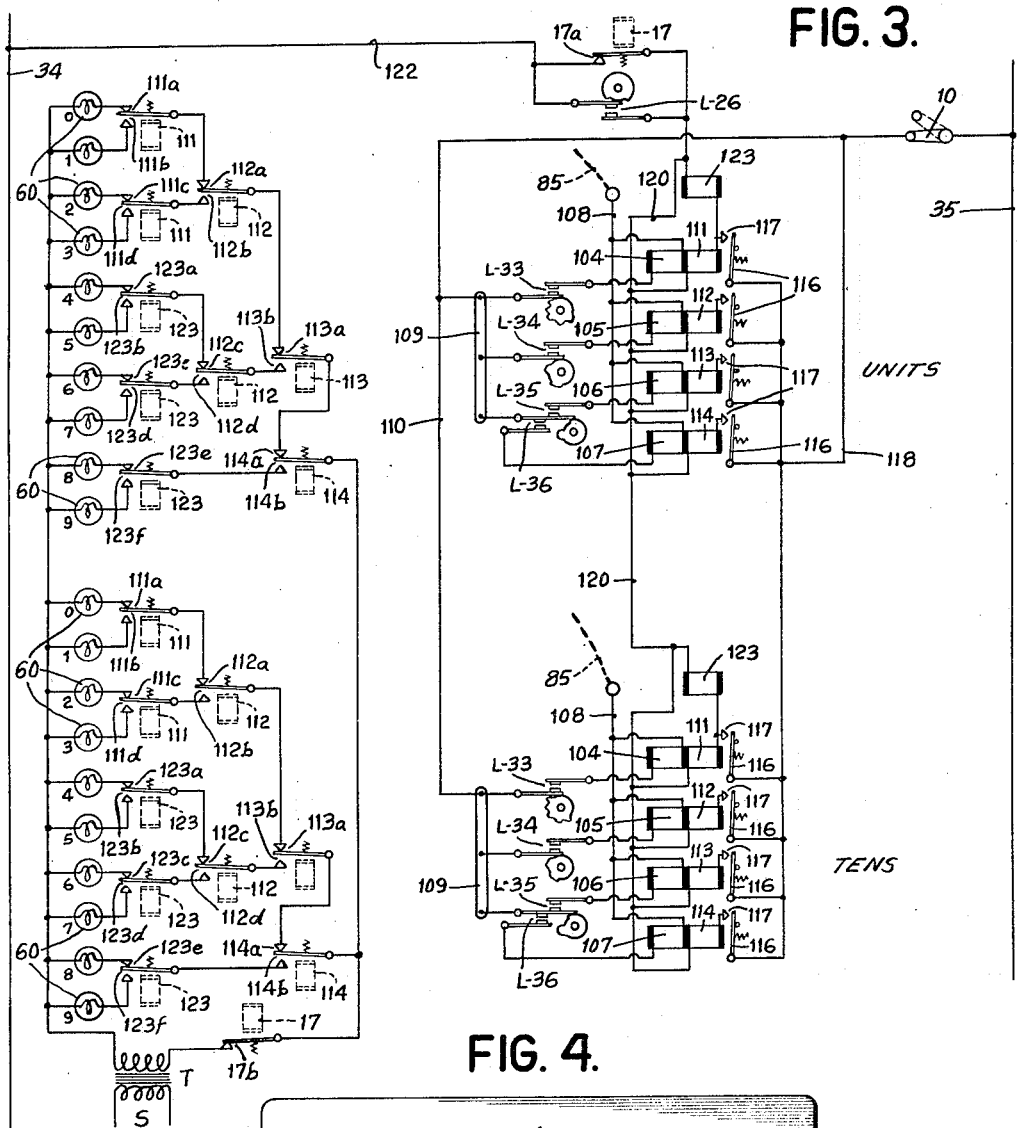

Dec. 30, 1941.   G. GHERTMAN   2,268,447
TABULATING MACHINE
Filed March 24, 1938   5 Sheets-Sheet 4

INVENTOR
Soima Ghertman
BY
W. M. Wilson
ATTORNEY

Dec. 30, 1941.  G. GHERTMAN  2,268,447
TABULATING MACHINE
Filed March 24, 1938   5 Sheets—Sheet 5

INVENTOR
Goma Ghertman
BY
ATTORNEY

Patented Dec. 30, 1941

2,268,447

UNITED STATES PATENT OFFICE 2,268,447

TABULATING MACHINE

Goino Ghertman, Saint Mande, France, assignor, by mesne assignments, to International Business Machines Corporation, New York, N. Y., a corporation of New York Application March 24, 1938, Serial No. 197,817

3 Claims. (Cl. 235—61.7)

This invention relates to accounting machines and more particularly to an improved form of device for indicating a change in group classification before a card of the new group classification becomes effective for controlling the adding and printing mechanisms of the accounting machine.

Accounting machines are designed to operate under control of perforated cards from which the data represented by the perforations are entered into accumulators and printed. Certain card columns are ordinarily used to indicate classification data and it is customary to control the machine operation from these classification columns. Briefly, before being analyzed the cards are sorted into groups of like classification and, as the cards feed through the accounting machine, the classification perforations establish a control circuit causing the accounting machine to continue as long as successive cards bear the same classification data. When the classification of card group changes, meaning that two successive cards have unlike classification perforations, the control circuit of the machine is interrupted causing the machine either to stop or to take a total as desired. Machines of the type described are provided with upper, or control brushes, to which the cards are first fed and lower, or adding brushes, to which each card is fed exactly one machine cycle later. It is often desirable to know not only when a group changes but also what particular group will be used to next control the machine. The first card in a group is fed to the upper brushes before the machine senses the difference between its classification data and that on the preceding card; consequently, the card which bears the first group designation of the succeeding group is already under the upper analyzing brushes before warning is given that the group is to change.

In certain cases it may be desirable to perform some operation either connected or not connected with the accounting machine for the new group. For example, in certain kinds of accounting practice it is considered desirable to print the items, or other data represented by perforations in the cards of a group, on ledger cards or statements identified by the same number. By indicating the group number prior to accounting operations in connection with that group the operator is informed which statement should be selected to receive the desired data. Where the statements carry previously inserted data the present structure insures that each statement will bear related information.

Upon insertion of the selected ledger sheet or statement in the printing mechanism the same will receive the data represented by the cards then fed to the machine upon its subsequent operation.

The main object of the present invention is to provide an improved means for successively indicating on a single group of indicating means the classification of record cards before any card has entered the analyzing mechanism which controls certain instrumentalities of the machine.

More specifically it is the broad object of the present invention to selectively set up on a plurality of relays a digit representing the perforation analyzed and to control by said relays some form of digit representing devices, such as indicating wheels or lamps which visually exhibit the digits.

Several forms of the invention are disclosed herein, either of which contains the present improvements as defined by the broad object of the invention.

One form consists of a series of relays of which there is one for each digit, these relays being selectively set individually under control of the perforation analyzing brushes. The selectively set-up relay controls the illumination of a related lamp which exhibits the associated digit.

A further modification consists in a simplified form wherein only four relays are utilized and are set up at differential times in synchronism with the analyzing of the perforations, singly or in combinations. The combinational set-up is translated into a single reading so as to selectively illuminate the lamps which exhibit the digits.

Another modification utilizing the four relay scheme consists of an arrangement whereby indicating wheels which are visually read are set up under control of the translator.

While the above forms of indicating devices can be utilized for a variety of purposes it is preferred to utilize them in connection with the indication of group numbers and it is a further object of the present invention to cause the group control means to suppress the indication, whether by lamps or wheels, until there is a change in group number. This is carried out by setting up the relays for each card and breaking down the set-up if there is no change in group numbers. The group control means is effective upon a change in group number to retain the set-up and to cause the relays set-up to control and effect the visual indication.

Further objects of the instant invention reside in any novel feature of construction or operation or novel combination of parts present in the embodiment of the invention described and shown in the accompanying drawings whether within or without the scope of the appended claims and irrespective of other specific statements as to the scope of the invention contained herein.

In the drawings:

Fig. 3 is an electrical wiring diagram of the modification utilizing the four combinational relay scheme setting up the digits by utilizing lamps.

Fig. 4 is a plan view of the digit exhibiting sign-board.

Figure 1:
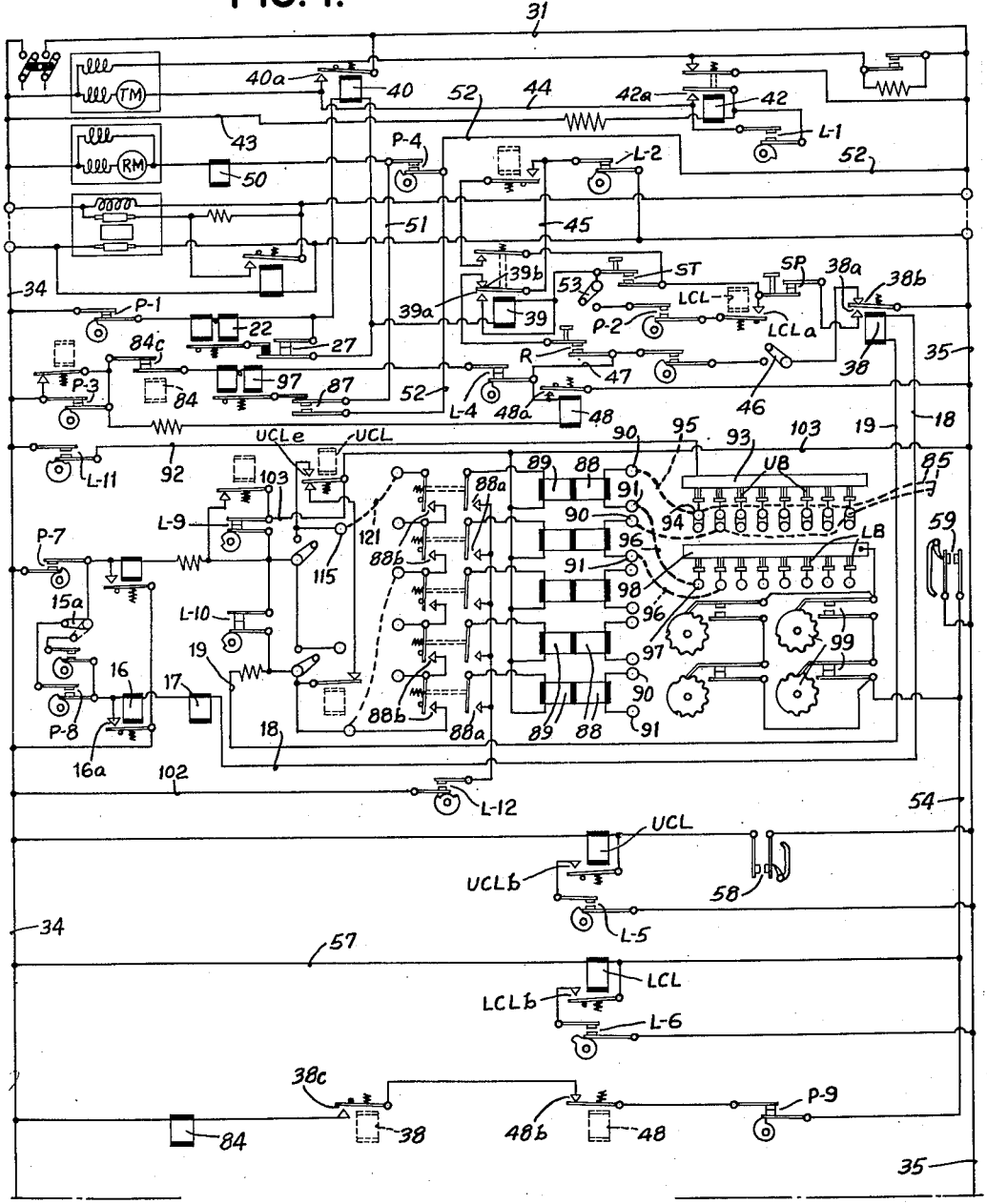
Fig. 1 is an electrical wiring diagram of a card controlled machine of a form well known in the art and to which machine the present improvements are preferably applied.

For further explanation of details of construction and operation of the electric accounting machine to which the present improvements are applied, reference should be had to the patent to C. D. Lake et al. No. 1,976,617, dated October 9, 1934.

In accounting machines of this class, as more particularly explained in the aforementioned patent, it is customary to send the machine through a reset cycle of operation to set up the automatic group control mechanism forming part of the present invention. Suffice it to say at the present time that during the resetting operation motor control magnet 38 (Fig. 1) is energized and a holding circuit is provided for maintaining it energized until the group control number of the cards being analyzed changes. Contacts 38a of this relay will, therefore, be closed and contacts 38b open.

*Starting circuit.*—The machine is now ready to start card feeding operations after cards have been placed in the feed magazine usually provided for in this type of machine. Depression of the start key to close contacts ST will complete a circuit as follows: from line 34, cam contacts P—1, card feed clutch magnet 22, contacts 27, start relay 39, start key contacts ST, stop key contacts SP, contacts 38a (now closed), to line 35. Energization of magnet 22 will cause opening of contacts 27 and the circuit will now include relay magnet 40 which is wired in parallel with the contacts 27. Magnet 40 will close its contacts 40a to complete a circuit through the motor as follows: from line 34, motor TM, contacts 40a, wire 31, to line 35, thus initiating the operation of the motor. After the motor has operated through a portion of the cycle, cam contacts L—1 close momentarily and complete a circuit from the line 34, wire 43, relay magnet 42, contacts L—1, wire 44, contacts 40a and wire 31 to line 35.

The consequent closure of contacts 42a will set up a holding circuit for the magnet 42, traceable from line 34, wire 43, magnet 42, contacts 42a, wire 44, contacts 40a, wire 31 to line 35. Energization of the start relay magnet 39 will effect closure of its contacts 39a to set up a holding circuit for the card feed clutch magnet 22 traceable from the line 34, cam contacts P—1, magnet 22, relay 40, magnet 39, contacts 39a, wire 45, cam contacts L—2, to line 35. Toward the end of this cycle, cam contacts L—2, break and the machine will coast through the remainder of the cycle to home position, which is, as commonly known in the art, termed the "D" position. A second machine cycle is now initiated by depression of the start key to close contacts ST and a second cycle will follow in the same manner as the first. During this second cycle, the first card is advanced to the lower brushes and a second card is fed from the supply magazine to the upper brushes. Following this second cycle, the machine will, as fully described in the aforementioned patent, do one of two things: if the automatic resetting switch 46 is open, the machine will stop; if the automatic resetting switch 46 is closed, the machine will automatically enter upon a resetting cycle of operation.

It has thus been explained that the initiation of operations of the machine require first a resetting operation followed by two successive, manually initiated, card feeding cycles followed by a resetting cycle which may be automatically initiated. At this point, the first card is in readiness to pass and be analyzed by the lower brushes LB and the second card is in readiness to pass and be analyzed by the upper brushes UB and the automatic control mechanism is in readiness to compare the classification data of the cards as they pass through the machine.

Following the reset cycle just explained, the machine will, if automatic start switch 53 is closed, automatically enter upon card feeding and analyzing operations immediately upon completion of the last resetting cycle. This is brought about in the following manner: Lower card lever relay contacts LCLa, by a circuit to be presently explained, have been closed due to the arrival of the first card at the lower brushes LB and during the reset cycle cam contacts P—1 close momentarily at the end of the cycle thereby establishing a circuit from the line 35, contacts 38a, contacts SP, LCLa and P2, switch 53, start relay magnet 39, contacts 27, card feed clutch magnet 22, contacts P1, to line 34. The energization of card feed clutch magnet 22 will, as explained above, cause the machine to enter upon a card feeding cycle of operation during which the record cards are successively analyzed and data thereon printed by the printing mechanism. Closure of lower card lever contacts 59 completes a circuit from line 35, contacts 59, wire 54 leading to relay magnet LCL, wire 57, to line 34 to effect closure of contacts LCLb and the closure of contacts LCLa mentioned above. Closure of contacts LCLb will complete a holding circuit for relay LCL through cam contacts L—6. This circuit is from line 35, contacts L—6, contacts LCLb, magnet LCL, wire 57, to line 34. As long as record cards continue to pass the lower brushes LB magnet LCL will remain continuously energized since contacts L—6 are timed to be closed during the interval that the card lever contacts 59 open.

The upper card lever contacts 58 similarly complete a circuit from the line 35, contacts 58, magnet UCL, to line 34. Closure of contacts UCLb sets up a holding circuit through cam contacts L—5 whose function and timing are the same as that of contacts L—6.

In certain forms of accounting practice it is desirable to determine when group control numbers change so that a classified ledger sheet can be selected out of a file and presented to the printing mechanism to receive the items pertaining to the group which has the same group number as the file number of the ledger sheet.

As is well known and fully described in the patent to Lake et al. No. 1,976,617, printing upon the ledger card is performed by a printing mechanism under control of the brushes LB which are suitably plugged to control the printer control magnets.

*Automatic control mechanism.*—The automatic control device described in detail in the aforementioned patent is employed in connection with the present improvement to determine whether a pair of record cards analyzed concurrently during the same card feeding machine cycle is identical with respect to their group control numbers.

A number of double wound relay magnets are provided, each having a pick-up winding 88 and a holding winding 89. Windings 88 terminate in plug sockets 90 and 91 by means of which the pick-up windings may be plug-connected in series with the upper brushes UB and the lower brushes LB. Since the index point positions of the card passing the lower brushes LB are analyzed concurrently with the analysis of the corresponding index point positions of the following card passing the upper brushes UB, perforations occurring in corresponding index positions of both cards will complete a circuit to the pick-up winding 88 at a time in the cycle of the operation of the machine corresponding to the location of the perforation.

*Control pick-up circuit.*—In view of the fact that a single double-wound relay magnet is provided for each card column the pick-up circuit for only one column will be described, it being assumed that brushes UB and LB locate corresponding perforations of a pair of records at the same time. This circuit is traceable as follows: from line 34, cam contacts L—11, wire 92, upper brush contact roller 93, one of the upper brushes UB contacting with the roller 93 through a perforation in the record, plug socket 94, plug connection 95, socket 90, winding 88, socket 91, plug connection 96, socket 97, to the brush LB of the corresponding column, through the perforation in the record at the lower brushes, lower brush contact roller 98, circuit breaking devices 99, lower card lever contacts 59, to the line side 35.

*Control holding circuit.*—The control holding circuit for a single order will now be explained. Energization of the winding 88 will close its contacts 88a and 88b, the former setting up a holding circuit for the winding 89 which is traceable as follows: from the line 34, wire 102, cam contacts L—12, contacts 88a (now closed), winding 89, wire 103 to the line side 35. Contacts L—12 hold the windings 89 energized until the end of the cycle and until the mechanism has performed its controlling function. It is thus apparent that the windings 88 are energized at differential times in accordance with the numeral designation of the controlling perforation and that the windings 89 hold all the stick circuits to keep the contacts 88b closed in all orders in which agreement occurred between the cards.

Since two card columns are assumed to be devoted to represent group numbers only two of the six double-wound relay magnets 88—89 are shown plug connected to the corresponding card columns of both the upper brushes UB and the lower brushes LB in the wiring diagram in Fig. 1. Obviously, if there is an agreement in all card columns, the two sets of contacts 88b will be closed after all the index point positions have been analyzed. In the event that there is disagreement in a perforation position of compared card columns, the winding 88 of the corresponding column will not be energized and the corresponding set of contacts 88b will, therefore, be open after the analyzing of the numeral positions of the card has been completed.

*Manual total and reset cycle*

To effect the initial and each successive total taking and reset cycle, the manually controlled reset key controlled contacts R (Fig. 1) are closed to complete a circuit from the line 35, contacts L—2 now closed, wire 45, contacts 39b, contacts R, wire 47, a relay magnet 48, contacts P—3 to line 34.

The closure of contacts 48a will set up a holding circuit for magnet 48 from the line 34, contacts P—3, magnet 48, contacts 48a, to line 35. A circuit is also completed from line 35, contacts 48a, contacts L—4, now closed, reset clutch magnet 97, contacts 84c, contacts P—3 to line 34. This will permit a completion of the circuit through the reset motor RM from the line 34, motor RM, magnet 50, wire 51, contacts 87, wire 52 to line 35. The motor RM will thereupon operate to drive the resetting mechanism for a cycle of operation during which contacts P—4 close to short circuit the contacts 87 and maintain the circuit through motor RM. At the end of the reset cycle, magnet 84 is energized by a circuit extending from line 34, magnet 84, relay contacts 38c, relay contacts 48b, cam contacts P—9, wire 54, card lever contacts 59 to line 35. The contacts 38a are controlled by the motor control magnet 38 and are opened when magnet 38 is deenergized due to a change in group control number in a manner to be explained.

Magnet 38 is normally held energized through a circuit setup during the total taking and reset cycle of the machine. During this cycle cam contacts P—7, P—8 (Fig. 1) close at the same time. The circuit will be completed from the line 34, contacts P—7, switch 15a, contacts P—8, control relay magnet 16, magnet 17 provided for the present invention, wire 18, motor control relay magnet 38, wire 19, cam contacts L—10, L—9, wire 103 to the right side of line 35. Relay magnet 16 closes its relay contacts 16a to establish a holding circuit from the line 34, contacts 16a, magnet 16 to line 35. This circuit remains closed as long as the group control numbers on the card do not change, it now being obvious that relay magnet 38 remains energized until the change in group control number occurs.

During the listing cycles the relay contacts 88b provide a shunt circuit around cam contacts L—10 and L—9. For example, this shunt circuit comprises the upper two relay contacts 88b used for controlling and short circuits both contacts L—10 and L—9 the short circuit extending from the lower blade of contacts L—10 serially through the two selected contacts 88b in accordance with the example selected, plug connection 121, plug socket 115, relay contacts UCL, which are closed while cards are passing the upper brushes to wire 103, and to line 35. Thus, if at the time contacts L—9 and L—10 open and the control relays have registered agreement between the two cards analyzed, the holding circuit will be sustained through the contacts 88b. If at such time any of the contacts 88b had failed to close, the holding circuit would have failed to remain closed and the control relay magnets 16 and 17 would also have been deenergized as well as the motor control relay 38 causing the stoppage of the machine for a subsequent manually controlled total taking and reset operation. This is effected by the manual depression of key R to thereby cause the machine to print the total of items on the classified ledger sheet and reset the accumulator in which the items are entered. The operator inserts the next classified ledger sheet in the printing mechanism after the total printing operation so that the next group of items are printed on the next classified ledger sheet.

In order to prevent listing operations from automatically following the manually controlled total taking and reset operation, the switch 53 is opened. The listing operations for the next inserted classified ledger sheet can be initiated by the manual depression of the key ST and they will be automatically continued until there is a change in group number.

*Group number indication*

It is desirable that the operator be informed of the group numbers of the successive groups of cards in order that the classified ledger sheets can be inserted in the printing mechanism prior to listing the groups of items. Such means comprises, in the present machine, visual indicating devices in the form of light or indicating wheels.

Figure 2:
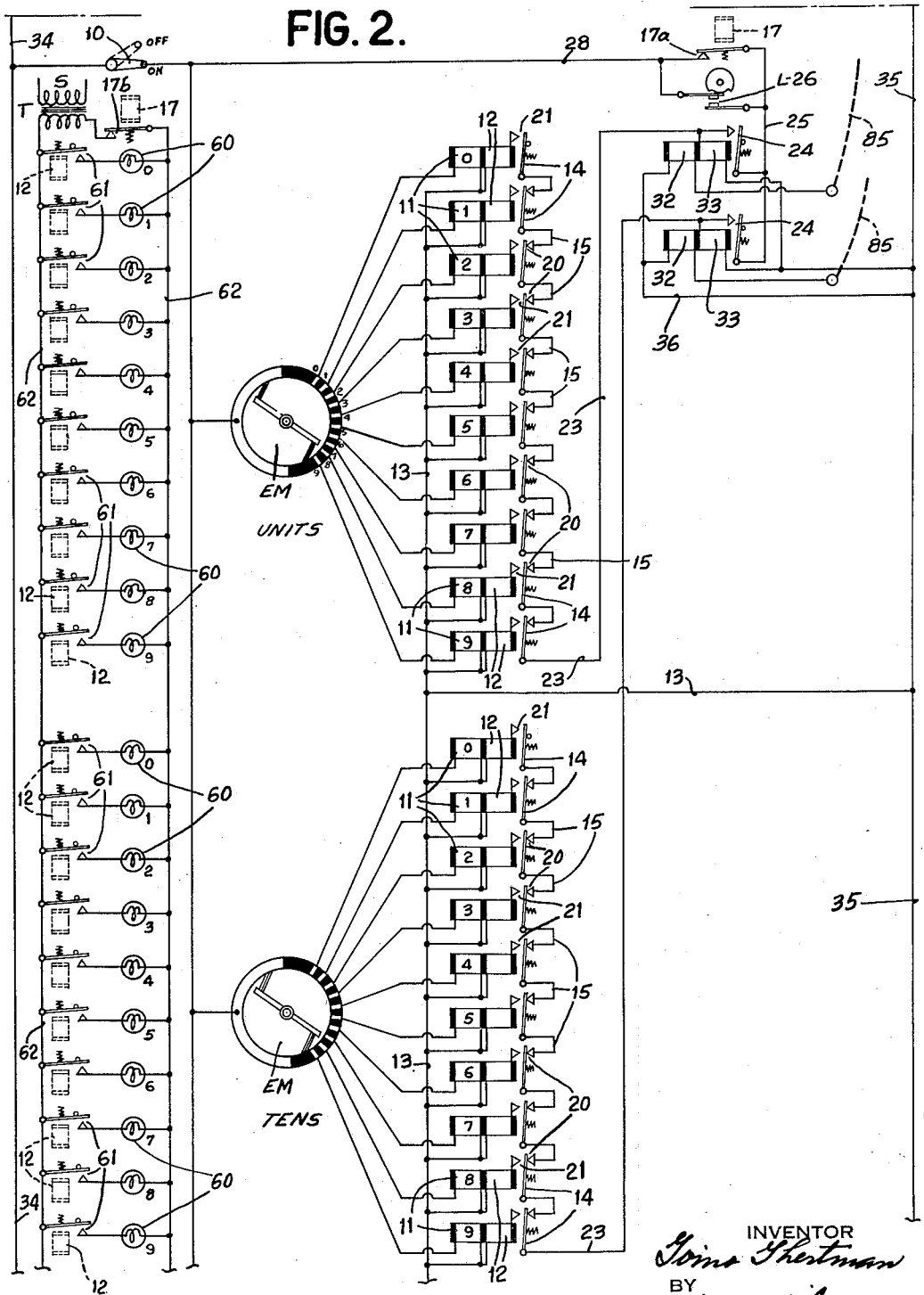
Fig. 2 is an electrical wiring diagram of one form of the invention utilizing the plural relays, one for each perforation.

Referring to Fig. 2, there will be seen an emitter EM which is in circuit connection with the line side 34 through a switch 10. The emitter sends electrical impulses to a series of ten pick-up relay magnets 11, the wire 13 connecting one side of all of the magnets 11 to the line side 35, and the emitter is driven by the same shaft that drives the listing contact cams —L— so that impulses are directed to the magnets 11 at the times the perforations are analyzed, or in other words, the emitter EM has the same timing as the circuit breaking devices 99.

The pick-up relay magnets 11 attract their armatures 14 and the latter are serially connected by wires 15 connected to the armatures and contacts 20. The wire 13 also connects one side of all the holding relay magnets 12, the other side of each relay magnet 12 leading to a contact 21. As each relay magnet 11 is energized, it will attract its armature 14 and the latter will open its contacts 20, if it is so provided with, and close its contacts 21, a circuit now being made from the line side 35, wire 13, a relay magnet 12, its contacts 21, its armature 14, and through the wires 15, contacts 20, and armatures 14 of the deenergized magnets 11—12 which are higher in serial order, to a wire 23, relay contacts 24, wire 25, cam contacts L—26, and wire 28 to switch 10, to the line side 34. Relay contacts 24 are open until a perforation is encountered by the upper brushes UB.

The arrangement is herein described for only one order, and is disclosed for two orders, so as to indicate a group number of two denominations. For the columns of the card which represent the group number the corresponding brushes UB are plug-connected by plug connections 85 (Figs. 1 and 2) to relay magnets 32, so that when a perforation is encountered the circuit leads from line side 34, cam contacts L—11 which are closed during the time the perforations are analyzed, wire 92, roller 93, brushes UB, a plug connection 85, relay magnet 32, wire 36 to the line side 35. When the relay magnet 32 is energized, it attracts its armature to close contacts 24 thus connecting the line side 34 to a particular holding magnet 12 corresponding to the digit representing perforation analyzed. It is pointed out that cam contacts L—26 have the same timing as cam contacts L—11 (see Fig. 6).

When any double wound relay magnet 11—12 is energized, it will be seen that the attraction of its armature 14 will disconnect the line 23 from the relay magnets 12 lower in serial order, even though the emitter EM causes the energization of the corresponding pick-up relay magnets 11. Hence, it is obvious that the perforations 0—9 will selectively cause the energization of a related holding relay magnet 12. When any digit representing perforation 1—9 or the zero perforation is analyzed, the pick-up relay magnet 32 will be energized to close contacts 24 and cause the energization of holding relay magnet 33 through the cam contacts L—26, which are also closed when these perforations are analyzed.

In the above manner the pick-up relay magnets 11 and 32 are selectively energized according to the perforations analyzed by the upper brushes and, when cam contacts L—26 open the stick circuit through relay contacts 24 is broken and the energized pick-up relays will be deenergized.

As previously stated, during listing operations the relay magnet 17 is energized and held energized by the relay contacts 16a during listing operations. The relay magnet 17, as shown in Fig. 2 controls its relay contacts 17a which are in shunt with cam contacts L—26. Obviously, during listing operation relay magnet 17 will keep relay contacts 17a open but upon a change in group number the relay magnet 17 will be deenergized so that relay contacts 17a will close. While cam contacts L—26 open, it will be seen that the relay contacts 17a will retain the selected holding relay magnets 12 and 33 energized when there is a change in group number.

For visual indication, there is provided a series of ten lamps 60 each of which is in series with a related relay contact 61 and is controlled by the associated holding relay magnet 12.

A line supply S induces through a transformer T a low voltage to line wires 62, the relay contacts 17b controlling the supply of low voltage current to the line wires 62. Obviously, when relay magnet 17 is deenergized upon a group change, relay contacts 17b close to supply current to line wires 62, and whichever relay contacts 61 are closed the related lamp 60 will be illuminated.

A sign board 63 (Fig. 4) is provided and behind each translucent glass disk 64 which carries a figure number a lamp 60 is placed. The illumination of the lamps 60 will selectively light up the figures to provide visible indication of the new group number and these figures will be visible when the machine stops at the change of a group number. The operator will then select a ledger sheet having the same group number. The total taking and reset operation will cause the relay magnet 17 to be energized and the opening of relay contacts 17a and 17b will cause the lamps to be extinguished ready to exhibit the next group number.

*Modification of group indication*

A modification of the group indication device is disclosed in Fig. 3 and the improved arrangement makes it possible to effect the same results in a simplified manner by the utilization of only five relays per card column.

Figure 6:
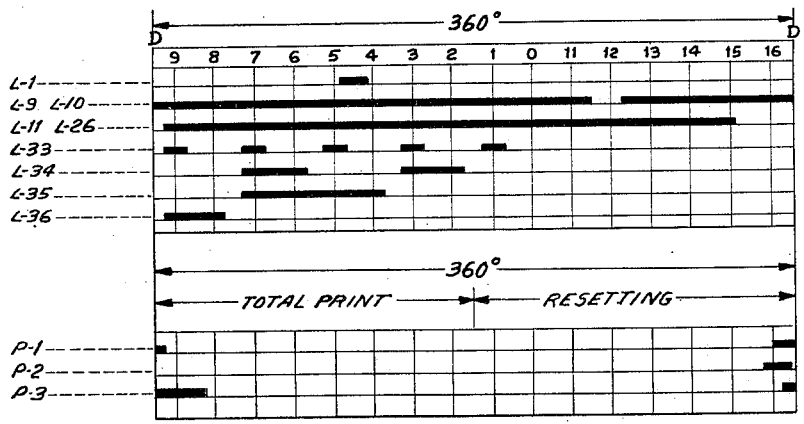
Fig. 6 is a timing diagram of some of the cam contact controlling devices of the machine particularly concerned within the present invention and of the cam contact controlling devices for the different modifications of the invention.

In Fig. 3 there will be seen four pick-up relay magnets 104, 105, 106 and 107 and by a common wire connection 108 they all have a connection to a socket in which the plug connection 85 from the upper brushes UB is inserted. The other side of each of the relay magnets 104, 105, 106 and 107 is connected to a bus bar 109 through related cam contacts L—33, L—34, L—35, L—36, respectively. The timing of these cam contacts is shown in Fig. 6. The bus bar 109 has a wire connection 110 to the line side 35 through the switch 10.

The perforation in the card connects the line side 34 to the relay magnets 104—107 by the following circuit, line side 34 (Fig. 1), cam contacts L—11, wire 92, upper brush contact roller 93, brush UB, plug connection 85, wire 108 to relay magnets 104—107. The line side 35 is connected to the relay magnets 104—107 in accordance with the closure of cam contacts L—33, L—34, L—35, L—36 to energize them singly or in combinations. For example, when the "9" perforation is analyzed cam contacts L—33 and L—36 are closed to energize relay magnets 104, 107. When the "6" perforation is analyzed cam contacts L—34 and L—35 are closed to energize relay magnets 105 and 106.

The holding magnets are designated 111, 112, 113, 114 each of which attracts its armature 116 to close related contacts 117, thereby providing a circuit from line side 35, switch 10, wire 118, attracted armature 116, related contacts 117, now closed, the related holding magnet, a wire 120 connecting all of the holding relay magnets, cam contacts L—26 previously described, and wire 122 to the line side 34. Whenever the relay contacts 117 of the holding magnet 111 are closed a relay magnet 123 is also energized since relay magnet 123 is in shunt with the holding magnet 111.

The cam contacts L—26 function as previously described, that is, to break down any relay magnets that have been energized and the relay contacts 17a previously described have the same function as previously described, that is, to provide a circuit to maintain the selected magnets energized upon a group change. The arrangement for visually indicating the group numbers by lamps is precisely the same as previously disclosed with the exception that the relay magnets 111, 112, 113, 114, and 123 control the opening and closing of their relay contacts, designated with alphabet subscripts and shown at the left in Fig. 3, singly or in combination to connect a selected lamp 60 across the line wires 62. The following table discloses the various instrumentalities utilized to exhibit the digits 0–9.

| Digit | Cam contacts | Energized relay magnets | Relay contacts to effect lamp circuit closure |
|---|---|---|---|
| 9 | L—33 / L—36 | 104–111, 123 / 107–114 | 123f closed. / 114b closed. |
| 8 | L—36 | 107–114 | 114b closed. |
| 7 | L—33 / L—34 | 104–111, 123 / 105–112 | 123d closed. / 112d closed. |
| | L—35 | 106–113 | 113b closed. |
| 6 | L—34 / L—35 | 105–112 / 106–113 | 112d closed. / 113b closed. |
| 5 | L—33 / L—35 | 104–111, 123 / 106–113 | 123b closed. / 113b closed. |
| 4 | L—35 | 106–113 | 113b closed. |
| 3 | L—33 / L—34 | 104–111, 123 / 105–112 | 111d closed. / 112b closed. |
| 2 | L—34 | 105–112 | 112b closed. |
| 1 | L—33 | 104–111, 123 | 111b closed. |
| 0 | None | None | None. |

*Group indication—Utilizing indicating wheels*

Figure 5:
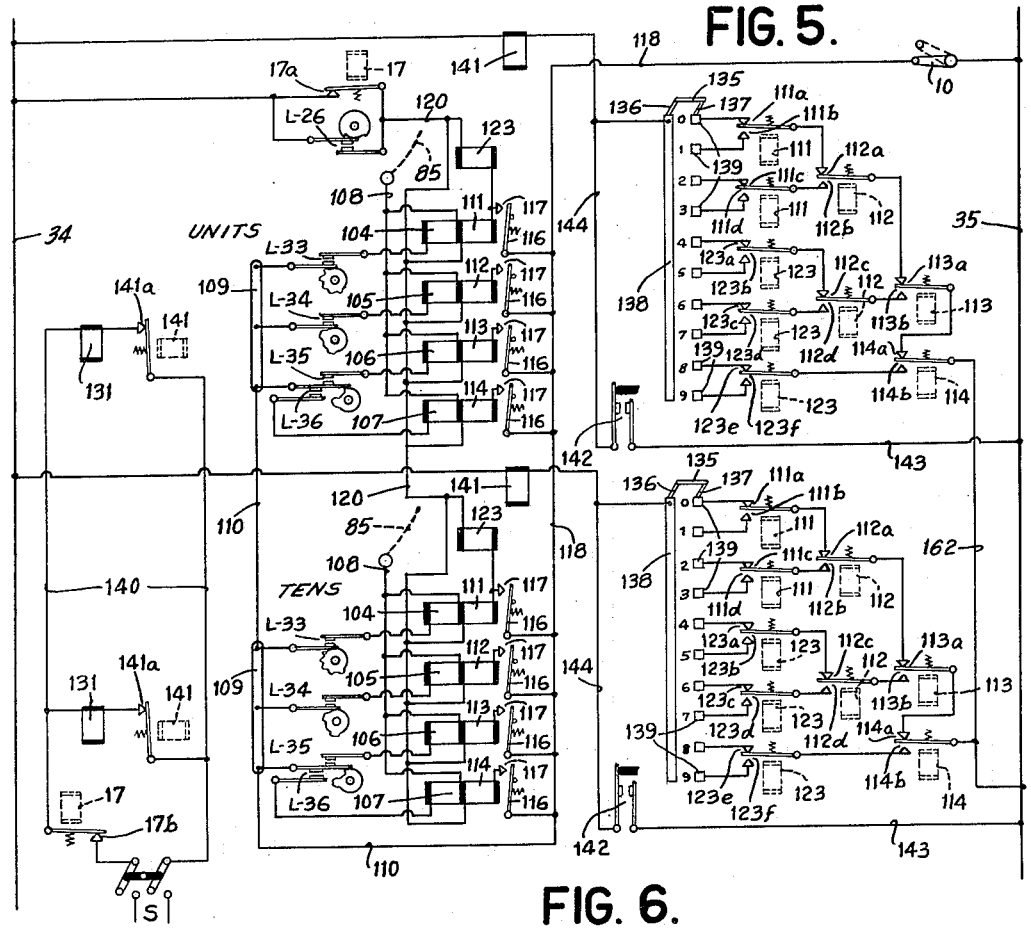
Fig. 5 is an electrical wiring diagram of another modification utilizing the four combinational relay scheme but showing the electrical arrangement for setting up the digits by utilizing indicating wheels.
Figure 8:
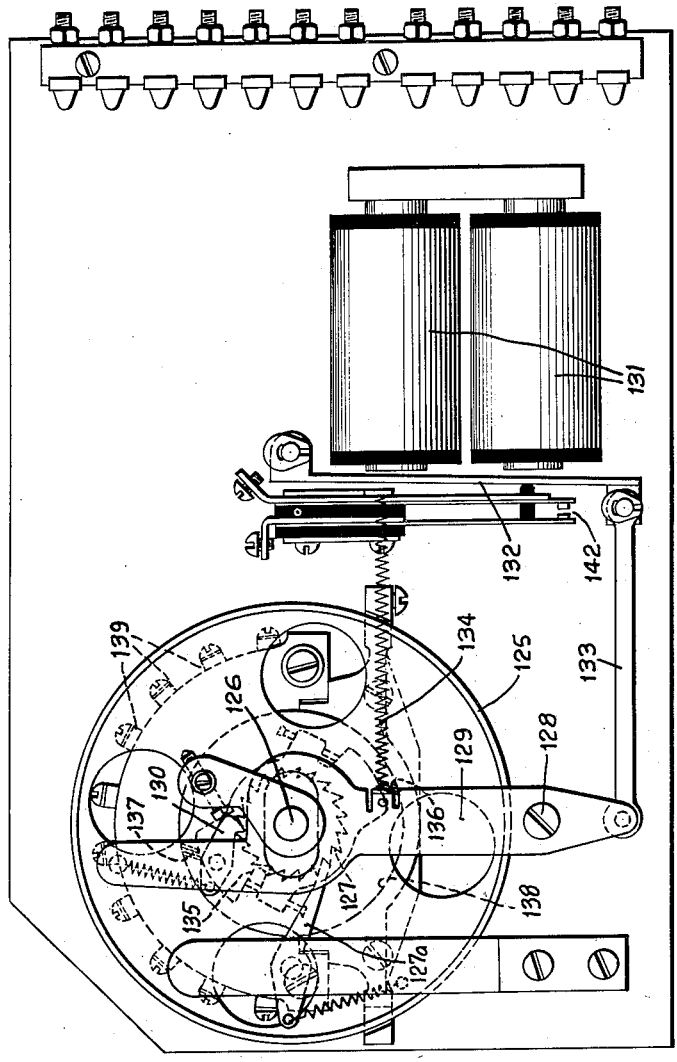
Fig. 8 is a view in side elevation of a digit representing wheel.
Figure 7:
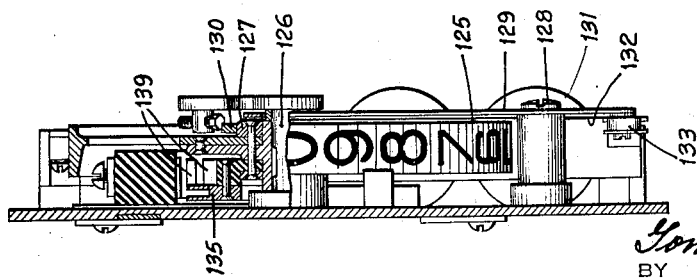
Fig. 7 is a fragmentary view in front elevation of a digit representing wheel.

Another modification is disclosed in Figs. 5, 7 and 8 and includes digit representing wheels which are set to represent the group numbers. This arrangement has been shown, by way of example, in connection with a machine of the type previously described but preferably utilizes the five relay scheme per order shown in Fig. 3.

Therefore, upon a change in group number relay magnets 111—114 and 123 are selectively energized in the manner previously described to close or open their respective relay contacts shown in Fig. 5 and designated by alphabetical subscripts.

Each digit representing wheel 125, of which there would be one for each denominational indication, is loosely mounted on a shaft 126 and has secured thereto a ratchet wheel 127. Pivoted by a stud 128 is a pawl operating lever 129 which carries a spring urged pivoted operating pawl 130 in the plane of the ratchet wheel 127. Each time an impulse is transmitted to a magnet 131, the armature 132 thereof will be attracted and through a link 133 will rock the pawl operating lever 129 about its pivot 128 to cause the pawl 130 to rotate the ratchet wheel 127 and indicator wheel one step. When the magnet 131 is deenergized, a return spring 134 will reversely rock the pawl operating lever 129 so that the pawl 130 will idly ratchet over the ratchet wheel 127. The indicator wheel 125 and ratchet wheel 135 are maintained in their rotated position by a retrograde preventing pawl 127a which is in engagement with the ratchet wheel 127.

Attached to the ratchet wheel 127 and the indicator wheel 125 is an element 135 carrying a brush 136 engaging a commutator segment 138 and a brush 137 engaging with one of a series of contact points 139 to which the relay contacts 111—114 and 123 designated with the alphabetical subscripts are wired thereto.

Referring to Fig. 5, current is applied to line wires 140 when a switch S is closed and the circuit connection to the step-by-step impulse magnets 131 for the two orders is controlled by the relay contacts 17b which are closed when the relay magnet 17 is deenergized and its relay contacts 17b are closed.

In the event that the column is perforated to represent zero, the related indicator wheel 125 will indicate zero and the brush 137 will be positioned to engage the "0" contact point 139. A circuit will then be made from the line side 34, to a relay magnet 141, commutator segment 138, brush 136, element 135, brush 137, the following relay contacts which are normally closed, 111a, 112a, 113a, 114a, wire 162 to the line side 35, thus causing relay magnet 141 to be energized to open its relay contacts 141a.

Upon a change in group designation when cam contacts L—9, L—10 open, relay magnet 17 is deenergized and relay contacts 17b will close to permit the current to be supplied to magnet 131. However, with the wheel at "0" and with no change in the designation relay magnet 141 will open its contacts 141a and prevent the energization of the magnet 131.

If it is assumed that the perforation analyzed in one column represents "6" it will be seen from the previously given table relay magnets 112 and 113 will be energized and relay contacts 112d and 113b will be closed.

Upon a change in group designation cam contacts L—9 and L—10 open causing relay magnet 17 to be deenergized and relay contacts 17b to close. Since relay contacts 113a will be open, the circuit through relay magnet 141 will be opened so with relay contacts 141a closed the magnet 131 will be energized to operate the lever 129 to turn the indicator wheel one step. The brush structure 136—135—137 will now be set to the "1" position and correspondingly so will the indicator wheel. When the magnet 131 is energized, the armature thereof will permit the contacts 142 to be closed (see Fig. 8) thereby extending a circuit from line side 35, wire 143, contacts 142, wire 144, magnet 141, to the line side 34. Relay magnet 141 will now open its relay contacts 141a to deenergize the magnet 131 and the return spring 134 will reversely rock the pawl operating lever 129. The reciprocating operation of the pawl operating lever 129 is repeated until the "6th" indicator position is reached whereupon a circuit will be closed to the magnet 141 to retain its relay contacts 141a open to prevent further energization of the magnet 131. This circuit is from the line side 34, magnet 141, segment 138, brush 136, element 135, brush 137, "6" contact point 139, relay contacts 123c, 112d and 113b now closed, wire 162 to the line side 35.

At the beginning of the following manual total taking and reset cycle relay magnet 17 is energized to open relay contacts 17b but the wheels will stay at their set positions.

Upon a change in the next group number the wheels will go forwardly to their next set positions. If a wheel should accidentally over-run the wheel will continue its forward rotation until in its next rotation it comes to the proper position thus automatically correcting any error that may arise.

While there has been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention therefore to be limited only as indicated by the scope of the following claims.

What is claimed is:

1. A cyclically operable record card controlled machine for indicating group numbers comprising, a plurality of storage relays, energizing means for said relays, means for analyzing the group number designations in the record cards, digit indicating devices controlled by said relays, means controlled by said analyzing means to select certain of said relays which are to be held energized upon energization by said energizing means, means controlled by the selected energized relays for causing said relays to be held energized to thereby set up in said relays a representation of the group number digit, means for rendering said last named means ineffective at the termination of each machine cycle for deenergizing the relays which have been energized, a group control means, means controlled by said group control means and rendered operative upon the latter determining a change in group numbers for rendering said means for deenergizing ineffective for retaining the energized relays energized at the termination of the machine cycle to thereby store in the energized relays the representation of the group number digit, and further means controlled by said group control means upon a change in group numbers for causing said storage relays to control said indicating devices to visually indicate therein the group number digit.

2. In a machine for effecting the indication of group numbers, the combination with a plurality of storage relays, of analyzing means for analyzing group number representing designations, impulse directing means for directing electrical impulses to said relays to energize the latter singly or in combination, means controlled by said analyzing means for determining the relays to be energized, means controlled by the energized relays for retaining the particular relays energized to which impulses are directed at the time the designation is analyzed to thereby store up in said relays a combinational representation, translating means including contact means set up by the energized relays to convert the combinational representation to a single digit representation, a step by step positionable indicator element and electromagnetic means for positioning said indicator element, means for initiating and effecting the transmission of successive electrical impulses from a source means to said electromagnetic means for positioning said indicator element step by step, and means controlled by said translating means and said indicator element for terminating the transmission of impulses when said indicator element is at a digit representing position corresponding to the digit representation of said translating means.

3. The structure according to claim 2 in which there is included in combination a group control means, means for deenergizing at the termination of each cycle the relays which have been retained energized, and means controlled by the group control means and rendered operative upon the latter determining a change in group number designations to render said means for deenergizing ineffective and to also cause the operation of the means for effecting the transmission of successive impulses.

GOINO GHERTMAN.